Patented July 1, 1941

2,247,752

UNITED STATES PATENT OFFICE 2,247,752

PROCESS FOR HALOGENATION OF PHTHALOCYANINES

Arthur Lawrence Fox, Woodstown, N. J., assignor to E. I. du Pont de Nemours & Company, Wilmington, Del., a corporation of Delaware No Drawing. Application June 23, 1937, Serial No. 149,884

9 Claims. (Cl. 260—314)

This invention relates to the halogenation of phthalocyanine coloring matters, and to certain novel coloring matters thus produced.

It is an object of this invention to provide an improved process for the halogenation of phthalocyanine compounds, whereby to facilitate the reaction and render the same more controllable, and whereby enable one to use less costly initial materials. It is a further object of this invention to provide an improved process for halogenating coloring matters of the phthalocyanine series whereby an optional proportion of halogen can be entered into the compound up to 16 atoms per molecule (in the case of chlorine). Other and further important objects of this invention will appear as the description proceeds.

Throughout this specification, and in the claims below the term "halogen" refers to the halogens chlorine and bromine only. The words "halogenation," "halogenating," etc., shall be construed in a correspondingly limited sense.

Phthalocyanine coloring matters are a series of novel compounds possessing the general empirical formula $C_{32}H_{16}N_8.X$, wherein the radical $C_{32}H_{16}N_8$ has a special characteristic structure, more fully discussed in the Journal of the Chemical Society, (London) for 1934, at pages 1035–1036. The letter X in the above formula stands for a bivalent base-forming radical, and may take the specific form of two hydrogen atoms; two monovalent metal atoms, for instance sodium; one bivalent metallic atom, for instance copper, iron, nickel, magnesium; or the bivalent radical of a polyvalent metal atom, for instance aluminum, whose residual valency is satisfied by any suitable atom or radical, for instance the OH group or a halogen atom. When X stands for the hydrogen atoms, the compound is sometimes referred to as metal-free phthalocyanine.

In U. S. Patent No. 2,000,052, the tetra-chloro and octa-chloro derivatives of magnesium phthalocyanine have been prepared by starting with an initially chlorinated (mono- or dichloro) phthalimide. In British Patent No. 410,814, the production of tetra-chloro copper phthalocyanine has been described by synthesis from 4-chloro-phthalonitrile. But these methods are not suitable for the production of phthalocyanines containing more than 8 atoms of chlorine per molecule, for the simple reason that the required tri- and tetra-halogen phthalonitriles are not known to exist.

In British Patent No. 461,268, which was published subsequent to the date of my invention, was described what appears to be the first attempt to produce halogenated phthalocyanine compounds by halogenation of the synthesized phthalocyanine compound. As halogenating agents therein it was proposed to employ normally liquid halogenating agents, such as sulfuryl chloride, thionyl chloride, bromine, or liquid chlorine. In most examples, the reaction was carried out in a sealed vessel, and at a temperature between 230 and 300° C. Although the patentees suggested the use of halogen carriers, naming among them aluminum chloride, the latter was employed only in conjunction with sulfuryl chloride, and then in limited quantity only as compared to the weight of halogenating agent. The bulk of the reaction medium thus consisted of the halogenating agent. In other words, the halogenating agent was depended upon to supply the liquid medium for the reaction, and the process was consequently limited to such halogenating agents as are liquid under the reaction conditions, or to such conditions of operation (e. g. autogenous pressure) as would maintain the halogenating agent in liquid condition. The process also required the use of a very large excess of halogenating agent.

It was found, moreover, according to this patent that the process was not successful in introducing beyond about 12.3 atoms of halogen per molecule, and that only by starting with a tetrachloro or octachloro-phthalocyanine compound could the halogen content of the final product be raised up to about 13 or 14 atoms per molecule. No compounds have been named or described containing more than 14 halogen atoms per molecule.

Although not fully explained in the patent, it appears, according to my experience therewith, that the process is limited by the fact that continued halogenation under the conditions therein described tends to destroy the phthalocyanine molecule, withdrawing first its metal content, and ultimately disrupting the ring to form halogenated phthalimide and various related byproducts. This tendency not only sets an upper limit to the degree of halogenation, but further reduces the yield of the desired reaction product, especially if it is near the upper limits of halogen content.

I have now found that the halogenation of phthalocyanine compounds, both metal free or metallic, may be effected with great facility if the reaction is carried out in a medium consisting predominantly of fused aluminum chloride. Such a medium may be composed of anhydrous aluminum chloride itself, or a mixture of anhydrous aluminum chloride and another inorganic chloride which aids in the fluxing thereof and reduces the temperature of the melt. An ideal medium from the viewpoint of commercial availability and economy is a mixture of aluminum chloride and sodium chloride. My invention, however, is not limited thereto, since other inorganic chlorides or bromides may be employed in lieu of sodium chloride or in addition thereto. As examples of such other halides may be mentioned potassium chloride, magnesium chloride, ferric chloride, cupric chloride, cuprous chloride, antimony pentachloride, antimony trichloride, or the corresponding bromides. The use of some of these halides in addition to sodium chloride has the further advantage that, beside reducing the fusion temperature of the mass, they have a catalytic effect, and act as so-called "halogen carriers."

My use of aluminum chloride as above set forth differs from the use thereof in British Patent No. 461,268, in this respect, that whereas in the British patent the aluminum chloride constitutes an auxiliary agent, the liquid medium for the reaction being furnished principally by the halogenating agent (sulfuryl chloride), in my invention the aluminum chloride constitutes the bulk of the flux, while the other ingredients need be present in minor proportions only. Indeed, the actual halogenating agent need not be present in any great concentration at all, but may be added gradually during the course of the reaction at a rate commensurate with its rate of consumption.

The advantages gained by the use of my invention are numerous and of great practical value.

In the first place, my invention enables me to use for chlorination gaseous chlorine, which is much less expensive than liquid chlorine or sulfuryl-chloride.

Secondly, no large excess of chlorinating or brominating agent need be employed and wasted; and this is a great economy since aluminum chloride is much cheaper than bromine or sulfuryl chloride.

Thirdly, I found that in my process halogenation proceeds under less drastic conditions than in the British patent. Thus, I need not build up autogenous pressure, and the reaction temperature may be in the neighborhood of 190° to 210° C. as compared to the range 230° to 300° C. required in most of the specific examples of the patent.

Fourthly, I found that by my improved process it is permissible to continue the chlorination to a much higher degree than in the patent. I am thus enabled to produce phthalocyanine compounds of over 13 atoms of chlorine per molecule, and, in extreme cases, as high as 16 atoms per molecule which is the theoretical maximum for copper or metal-free phthalocyanine. Likewise, by the aid of bromine I am enabled to produce a mixed halogenated product of about 14 atoms total halogen per molecule.

Fifthly, whichever halogen content is selected as the end-point, the yield by my process is much higher than in the patent, the loss by decomposition being much lower.

Finally, the entire reaction becomes more readily controllable in various other details, to produce an optimum end-product at greatest economy.

My invention also led me to the discovery of novel coloring matters of the phthalocyanine series which in themselves constitute a valuable contribution to the art in view of the distinctive qualities and superior green shades of the higher halogenation products. Thus, I found that as the chlorine content of a phthalocyanine compound passes beyond 13 atoms per molecule there is an abrupt and unexpected increase in the greenness of the color, reaching in the extreme cases a bright-green shade hitherto unavailable in colors of this series.

It will be understood, of course, that although I have indicated above certain advantages of my invention in enabling one to operate under certain simplified conditions or to reach certain high-degree end-points, my invention is by no means limited to such conditions of operation or to such end points. For instance, although my invention enables one to operate in an open vessel to advantage, it may nevertheless be carried out in a closed vessel or under pressure if one prefers. Likewise, although the use of gaseous chlorine is one of the principal economies of my improved process, one may nevertheless practice my invention with liquid chlorine or with sulfuryl chloride, if one chooses. Indeed, my invention is not limited to chlorination, but may also be applied to brominations. Nor is one limited to the gradual feeding in of the halogenating agent, but may add all the requisite halogenating agent, or even an excess thereof, at once. Finally, my invention may be applied to the manufacture of lower chlorination products where these are desirable.

In each of the cases mentioned in the last paragraph, there will, of course, be sacrificed one or more of the valuable advantages of my invention, but by virtue of the great flexibility of my improved process there will still remain sufficient advantage in the remaining details of my process to justify the use of my invention.

With reference to the products produced according to this invention, it will be understood that inasmuch as these are used as pigments or coloring matter, there is no necessity of isolating any individual compounds in pure form. My invention accordingly includes the production of mixtures of compounds as well as individual compounds, and where the chlorine content or the green shade of a given reaction product is referred to, the content or shade of the entire composition is to be understood rather than that of any particular ingredient thereof.

It is remarkable that although the analysis of the final product in some cases shows the presence in minor quantities of aluminum, presumably as chloro-aluminum-polychloro-phthalocyanine, and in some cases also the presence of antimony, the brightness of the color and its light fastness do not seem to be impaired.

The working up of the reaction mass may be done in either one or two ways. It may be drowned directly into dilute acid and the cake filtered off and dried, followed by acid pasting to produce a finely divided product; or the reaction mass may be cast into pans and allowed to cool after which the solid is broken up and added to dilute acid. This second method offers operating advantages in certain cases. In either case the product may be acid pasted in sulfuric acid or chlorsulfonic acid or a mixture of chlorsulfonic and sulfuric acids. It will also be recognized that drowning conditions for the aluminum chloride-sodium-chloride melt may be so regulated as to obtain a very finely divided product which for many uses will not need further acid pasting.

Without limiting my invention to any particular procedure, the following examples are given to illustrate my preferred mode of operation. Parts mentioned are by weight.

Example 1

|  | Parts |
|---|---|
| Aluminum chloride (anhydrous) | 450 |
| Sodium chloride | 110 |
| Cupric chloride | 20 |
| Copper phthalocyanine (ground to 60 mesh) | 60 |

These are placed in a flask which is in an oil bath and heated until the inside temperature is 200° C. At this point dried chlorine is passed in at a vigorous rate for one hour and ten minutes. The flask is then quickly removed from the oil bath and poured quite rapidly into 2000 parts of water containing 237 parts of 37% hydrochloric acid. During the drowning operation the dilute hydrochloric acid is kept vigorously stirred and it heats up to the boil. When all of the reaction mass has been poured in, the flask is rinsed out with fresh water and added to the drowned mass. This is then diluted to a total of about 4000 parts and filtered and washed until acid free. The cake is then dried as is or in the presence of a protective colloid or dispersing agent.

The dried crude chlorinated copper phthalocyanine obtained above is now acid pasted by dissolving the same in 1200 parts of sulfuric acid monohydrate at 0° to 10° C., and filtering off any insoluble residue. The residue is washed with additional 40 parts of monohydrate at 0° to 10° C., and the combined monohydrate filtrates are drowned in 8000 parts of water. The resulting precipitate is then filtered off, washed acid free and dried.

The yield of purified product is 85 parts, analyzing 48.19% chlorine by weight, which corresponds to about 14.7 atoms per molecule. The product is a very bright pure green pigment showing light fastness properties equal to copper phthalocyanine.

Example 2

|  | Parts |
|---|---|
| Aluminum chloride | 400 |
| Sodium chloride | 100 |
| Antimony trichloride | 30 |

These were melted in a flask which was placed in an oil bath and the inside temperature raised to 200–210° C. Then 29 parts of copper phthalocyanine were added and chlorine was passed in for 1½ hours at a temperature of 200–210° C. The mass was then drowned in 3000 parts of water and 500 parts of 10% hydrochloric acid, and the diluted mass was heated to the boil. It was then filtered, washed and again slurried in 3000 parts of boiling water containing 237 parts of 37% hydrochloric acid. It was then filtered and dried. Crude yield=50 parts. This was acid pasted in 500 parts of sulfuric acid monohydrate, filtered and drowned. The final yield was 41 parts of a product having the following analysis:

|  | Per cent |
|---|---|
| Chlorine | 44.51 |
| Copper | 2.81 |
| Aluminum | .28 |

The chlorine content corresponds to about 12.75 atoms per molecule.

Example 3

|  | Parts |
|---|---|
| Aluminum chloride | 450 |
| Sodium chloride | 110 |
| Antimony trichloride | 30 |
| Chloro aluminum phthalocyanine | 29 |

These were placed in a flask heated in an oil bath until the inside temperature was 200° C. Chlorine was passed in at this temperature for 2 hours. The melt was then drowned in 3000 parts of water containing 237 parts of 37% hydrochloric acid, filtered, washed and dried. Yield—48.5 parts=97% of theory based on hydroxy-aluminum-chlor-phthalocyanine containing 11.3 chlorine atoms per molecule.

Analysis:

|  | Per cent |
|---|---|
| Chlorine | 42.2 |
| Aluminum | 5.95 |

The product was a very bright green pigment showing the usual poor light fastness of aluminum phthalocyanines.

Example 4

This example is similar to Example 2, except that instead of 29 parts of copper phthalocyanine, 150 parts were used. The crude yield was 248 parts with an analysis of 46% chlorine and 4.96% copper. On acid pasting 155 parts of a product were obtained containing 13.46 chlorine atoms per molecule.

Analysis:

|  | Per cent |
|---|---|
| Chlorine | 45.87 |
| Copper | 4.70 |
| Antimony | .003 |
| Aluminum | .036 |

The product was a very bright yellow green.

Example 5

|  | Parts |
|---|---|
| Aluminum chloride | 450 |
| Sodium chloride | 110 |
| Antimony trichloride | 30 |
| Cupric chloride | 50 |
| Copper phthalocyanine | 60 |

These were mixed in a flask heated to 200° C. inside temperature and chlorine was passed in for 1½ hours. The rate of chlorination was distinctly faster than in runs not containing cupric chloride. After 1½ hours the reaction mass was drowned in 2000 parts of water containing 237 parts of 37% hydrochloric acid. The product was filtered, washed well and dried. Yield, 82 parts.

Analysis:

|  | Per cent |
|---|---|
| Chlorine | 44.15 |
| Copper | 4.48 |
| Antimony | 2.86 |
| Aluminum | .37 |

Example 6

|  | Parts |
|---|---|
| Aluminum chloride | 450 |
| Sodium chloride | 110 |
| Copper phthalocyanine | 60 |

These were heated in an oil bath to 200° C. and a stream of chlorine passed in for 1½ hours. The product was then drowned in 3000 parts of water containing 237 parts of 37% hydrochloric acid.

The product was acid pasted in sulfuric acid monohydrate and the yield was 78.6 parts.

Analysis:

|  | Per cent |
|---|---|
| Chlorine | 34 |
| Aluminum | .09 |
| Copper | 6.57 |

Example 7

|  | Parts |
|---|---|
| AlCl₃ | 910 |
| NaCl | 220 |
| CuCl₂ | 40 |
| Copper phthalocyanine | 120 |

These were charged into a flask and maintained at 200-210° C. for 3 hours while 1005 parts of chlorine were passed through. The product was then poured out in pans and allowed to cool. The solidified pieces were charged into 8000 parts boiling water containing 64 parts of 37% HCl. The crude chlorinated copper phthalocyanine was filtered off and dried.

It was then acid pasted in 1750 parts of a mixture of 25% chlor sulfonic acid and 75% sulfuric acid monohydrate.

Analysis:

|  | Per cent |
|---|---|
| Chlorine | 47.8 |
| Copper | 5.54 |
| Aluminum | .04 |

The product is 95% pure chlorinated copper phthalocyanine containing 16 chlorine atoms per molecule.

The following examples show the application of my invention to bromination.

Example 8

|  | Parts |
|---|---|
| Aluminum chloride | 450 |
| Sodium chloride | 110 |
| Copper phthalocyanine | 60 |
| Cupric chloride | 20 |

These were melted in an oil bath at 200° C. and then 400 parts bromine was passed in over a period of 1½ hours. The product was drowned in dilute acid, filtered and washed.

The product was then acid pasted in sulfuric acid monohydrate giving a yield of 114 parts which corresponds to about 91% of theory.

Analysis:

|  | Per cent |
|---|---|
| Bromine | 52.3 |
| Chlorine | 3.18 |
| Copper | 4.12 |
| Aluminum | Nil |

The product was a green somewhat bluer in shade than the chlorinated phthalocyanines containing 13 to 16 chlorine atoms.

Example 9

|  | Parts |
|---|---|
| Aluminum chloride | 450 |
| Sodium chloride | 110 |
| Cuprous chloride | 20 |
| Copper phthalocyanine | 60 |

These were melted in an oil bath and a stream of bromine gas (obtained by bubbling nitrogen through liquid bromine and then through the melt) was passed in for five hours at a temperature of 200-210° C. The liquid melt was then drowned in 3500 parts of boiling water containing 200 parts of 37% HCl. The pigment thus precipitated was filtered off and washed with 4000 parts of 1% HCl solution, and was then washed acid free with water. Yield 141 parts. The product contained 11 bromine atoms and 3 chlorine atoms and was a much yellower shade of green than has been possible to obtain by the use of chlorine alone.

The following additional examples illustrate various modified conditions for carrying out my invention.

Example 10

The chlorination of copper phthalocyanine in an aluminum chloride-sodium chloride melt using anhydrous ferric chloride as catalyst.

|  | Parts |
|---|---|
| Aluminum chloride | 450 |
| Sodium chloride | 110 |
| Ferric chloride | 20 |
| Copper phthalocyanine | 60 |

These were well mixed and placed in a flask immersed in an oil bath. The contents of the flask were raised to 200-210° C., and chlorine was passed in for four hours, meanwhile stirring the liquid melt. Then the contents of the flask were drowned in 3000 parts of boiling water containing 200 parts of 37% HCl. The green pigment precipitating as a result of the drowning operation was filtered off and washed with 4000 parts of 1% HCl solution, and then washed with water until acid free. The product was then dried, and found to contain 45.3% by weight of chlorine. Its Fe content was only 0.28%.

Example 11

Chlorination of chlor-iron phthalocyanine in aluminum-chloride-sodium-chloride fusion.

|  | Parts |
|---|---|
| Aluminum chloride | 450 |
| Sodium chloride | 110 |
| Cuprous chloride | 20 |
| Iron phthalocyanine | 60 |

These were placed in a flask and heated to 200-210° C., and chlorine passed in for three hours. The fusion mass was then drowned in 3000 parts of boiling water containing 200 parts of 37% HCl. The pigment thus precipitated was filtered off and washed with 4000 parts of 1% HCl solution and was then washed acid free. Yield 114 parts.

The analysis showed 50.4% chlorine indicating the presence of 16 chlorine atoms.

Example 12

The chlorination of copper phthalocyanine in aluminum-chloride-sodium-chloride fusion using a mixture of sulfur dioxide and chlorine as the chlorinating agent.

|  | Parts |
|---|---|
| Aluminum chloride | 450 |
| Sodium chloride | 110 |
| Copper phthalocyanine | 60 |

These were mixed well and heated in a flask to 200-210° C., meanwhile passing in a gaseous mixture of sulfur dioxide and chlorine for five hours. During this time a total of 1568 parts of SO₂ and 594 parts of chlorine were used. The melt was then drowned in 3000 parts of boiling water containing 200 parts of 37% HCl. The pigment thus precipitated was filtered off and washed with 4000 parts of 1% HCl solution and then with water until free of acid.

Upon drying, the product analyzed between 13 and 14 chlorine atoms per molecule.

It will be understood that the above examples are merely illustrative, and that the details of procedure may be varied within wide limits without departing from the spirit of this invention. Thus, the degree of chlorination in each example is somewhat arbitrary, and products of higher halogen content can be obtained simply by continuing the entry of chlorine or bromine until a test sample shows the desired halogen content.

Likewise, the temperature of halogenation may be varied outside the limits preferred in the above examples, and may in fact be any temperature between the fusion point and boiling point of the melt employed.

In the examples above given the ratio of sodium chloride to aluminum chloride was consistently maintained at about 1:4. This is merely a convenience, because this ratio, being substantially the eutectic ratio of the two components, gives the lowest fusion point. In actual practice this ratio may be varied within wide limits, even to the point of using no sodium chloride at all. Alternatively, part or all of the sodium chloride may be replaced by potassium chloride, magnesium chloride, antimony chlorides, etc., as already pointed out above.

The proportion of cupric chloride as a preferred catalyst may likewise vary within wide limits, from the point of using no cupric chloride at all to the point of replacing the entire sodium chloride in the melt. In other words the cupric chloride may be employed to combine the functions of a halogen carrier and of a flux for the aluminum chloride.

It will be understood that in lieu of cupric chloride, ferric chloride, nickel chloride or antimony chloride in the above examples, other salts of the above metals, whether in the -ic state or the -ous state, may be employed, which under the action of the halogenating agent would give the corresponding final halides automatically. As specific illustrations of such applicable salts may be mentioned: copper sulfate, copper acetate, cuprous chloride, cuprous or cupric bromides, cuprous or cupric oxide; nickel sulfide, nickel phosphate, nickel formate, nickel oxide or hydroxide; iron oxide, iron sulfate, ferric nitrate, other iron salts. Compounds of metals other than those above-mentioned may also be used, for instance salts of cobalt, manganese, chromium, vanadium, titanium, molybdenum and other halogen carriers.

Other variations and modifications will be readily apparent to those skilled in the art.

I claim:

1. In the process of halogenating coloring matters of the metal phthalocyanine series, the improvement which comprises effecting the halogenation in a medium consisting predominantly of molten aluminum chloride and containing further a halide selected from the group consisting of iron, nickel, copper and antimony chlorides and bromides.

2. The process of chlorinating a coloring matter of the metal phthalocyanine series, which comprises suspending the coloring matter in a melt of aluminum chloride and sodium chloride containing further a halogen carrier selected from the group consisting of the chlorides and bromides of iron, nickel, copper and antimony, and passing in a chlorinating agent until the desired degree of chlorination has been attained.

3. A process as in claim 2, the temperature of the melt being maintained at about 190 to 210° C.

4. A process as in claim 2, the chlorinating agent being gaseous chlorine.

5. A process of chlorinating copper-phthalocyanine, which comprises suspending copper-phthalocyanine in an aluminum-chloride-sodium-chloride melt maintained at a temperature of about 190 to 210° C., and passing in gaseous chlorine until the desired degree of chlorination has been attained.

6. A process as in claim 5, the melt containing further copper chloride.

7. A process as in claim 5, the entry of chlorine being continued until not less than 13 atoms of chlorine per mol of initial phthalocyanine have been absorbed.

8. In the process of chlorinating copper-phthalocyanine the improvement which comprises effecting the chlorination in an aluminum chloride melt containing copper chloride.

9. In the process of chlorinating copper-phthalocyanine the improvement which comprises effecting the chlorination in an aluminum-chloride-sodium-chloride melt containing cupric chloride as a halogen carrier.

ARTHUR L. FOX.